US012812485B2

(12) United States Patent
Van Der Velde et al.

(10) Patent No.: US 12,812,485 B2
(45) Date of Patent: Nov. 24, 2026

(54) METHOD AND APPARATUS FOR A MINIMIZATION OF DRIVE TEST IN A WIRELESS COMMUNICATION SYSTEM

(71) Applicant: SAMSUNG ELECTRONICS CO., LTD., Suwon-si (KR)

(72) Inventors: Himke Van Der Velde, Staines (GB); Sangyeob Jung, Suwon-si (KR); Seungbeom Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 313 days.

(21) Appl. No.: 18/552,390

(22) PCT Filed: Mar. 28, 2022

(86) PCT No.: PCT/KR2022/004310
§ 371 (c)(1),
(2) Date: Sep. 25, 2023

(87) PCT Pub. No.: WO2022/203478
PCT Pub. Date: Sep. 29, 2022

(65) Prior Publication Data
US 2024/0196286 A1 Jun. 13, 2024

(30) Foreign Application Priority Data
Mar. 26, 2021 (GB) ...................................... 2104289
Mar. 24, 2022 (GB) ...................................... 2204156

(51) Int. Cl.
*H04W 36/00* (2009.01)
*H04W 36/08* (2009.01)

(52) U.S. Cl.
CPC .............. *H04W 36/008355* (2023.05); *H04W 36/0058* (2018.08); *H04W 36/0072* (2013.01); *H04W 36/08* (2013.01)

(58) Field of Classification Search
CPC ..... H04W 36/008355; H04W 36/0058; H04W 36/0072; H04W 36/08; H04W 24/10;
(Continued)

(56) References Cited

U.S. PATENT DOCUMENTS

2013/0012188 A1* 1/2013 Gao .................. H04W 36/0085 455/422.1
2015/0044972 A1* 2/2015 Lee ....................... H04W 24/10 455/67.11
(Continued)

FOREIGN PATENT DOCUMENTS

EP 3749007 A1 12/2020
WO 2021028397 A1 2/2021
WO WO-2021145805 A1 * 7/2021 ............ H04W 76/27

OTHER PUBLICATIONS

ZTE Corporation, Sanechips, "Logged MDT enhancements", 3GPP TSG RAN WG2#113-e, R2-2101591 (Year: 2021).*
(Continued)

*Primary Examiner* — Ayaz R Sheikh
*Assistant Examiner* — Mang Boi Thawng

(57) ABSTRACT

The disclosure relates to a 5G or 6G communication system for supporting a higher data transmission rate. In an embodiment, a method of performing Minimising Drive Test (MDT) of a user equipment (UE) in a wireless communication system is provided. The method comprises: receiving, from a base station, a configuration including inter radio access technology (IRAT) frequencies; performing measurement on available IRAT frequencies based on the configuration; and logging the measurement results.

12 Claims, 4 Drawing Sheets

(58) Field of Classification Search
CPC ..... H04W 16/18; H04W 24/08; H04W 24/02; H04W 28/0284; H04L 41/0806; H04L 43/0805; H04L 41/16; H04L 43/06; H04L 43/0864; H04L 43/16
See application file for complete search history.

(56) References Cited

U.S. PATENT DOCUMENTS

| | | | | |
|---|---|---|---|---|
| 2021/0235300 A1* | 7/2021 | Teyeb | .................. | H04W 24/10 |
| 2022/0046456 A1* | 2/2022 | Kumar | .................. | H04W 24/10 |
| 2023/0090309 A1* | 3/2023 | Kazmi | .................. | H04W 24/02 |
| 2023/0171615 A1* | 6/2023 | Bansal | .................. | H04W 24/02 370/329 |
| 2023/0354078 A1* | 11/2023 | Liu | ....................... | H04W 24/08 |

OTHER PUBLICATIONS

Huawei (Summary rapporteur), "Report of [AT113-e][844][NR/R17 SON/MDT] Logged MDT part I", 3GPP TSG-RAN WG2 Meeting #113 electronic, R2-2102143 (Year: 2021).*
Samsung, "MDT for early measurements (Logged, Immediate)", 3GPP TSG-RAN WG2#107 bis meeting, R2-1913251 (Year: 2019).*
International Search Report and Written Opinion of the International Searching Authority dated Jul. 6, 2022, in connection with International Application No. PCT/KR2022/004310, 11 pages.
Qualcomm Incorporated, "Logged measurement Enhancements," 3GPP TSG-RAN WG2 Meeting #113-e , R2-2101341, Electronic, Jan. 25-Feb. 5, 2021, 5 pages.
Samsung Electronics et al., "Clarification on logged MDT for IRAT and non-SIB4 NR frequencies," 3GPP TSG-RAN2 WG2 Meeting #113-e, R2-2100583, Online, Jan. 25-Feb. 5, 2021, 7 pages.
Qualcomm Incorporated, "Handling of NR QoE reporting," 3GPP TSG-RAN WG2 Meeting #113-e, R2-2101339, Electronic, Jan. 25-Feb. 5, 2021, 5 pages.
Samsung, "Progressing Logged MDT for R17 concerning MR-DC, IRAT, IDC and on demand SI," 3GPP TSG-RAN WG2#113-e Meeting Tdoc, R2-2101945, Online, Jan. 25-Feb. 5, 2021, 7 pages.
Combined Search and Examination Report issued Oct. 3, 2022, in connection with United Kingdom Patent Application No. GB2204156.0, 7 pages.
CMCC et al., "Status report for WI on enhancement of data collection for SON_MDT in NR and ENDC," RP-210387, 3GPP TSG RAN meeting #91-e, Online, Mar. 22-26, 2021, 12 pages.

* cited by examiner

[Fig. 1]
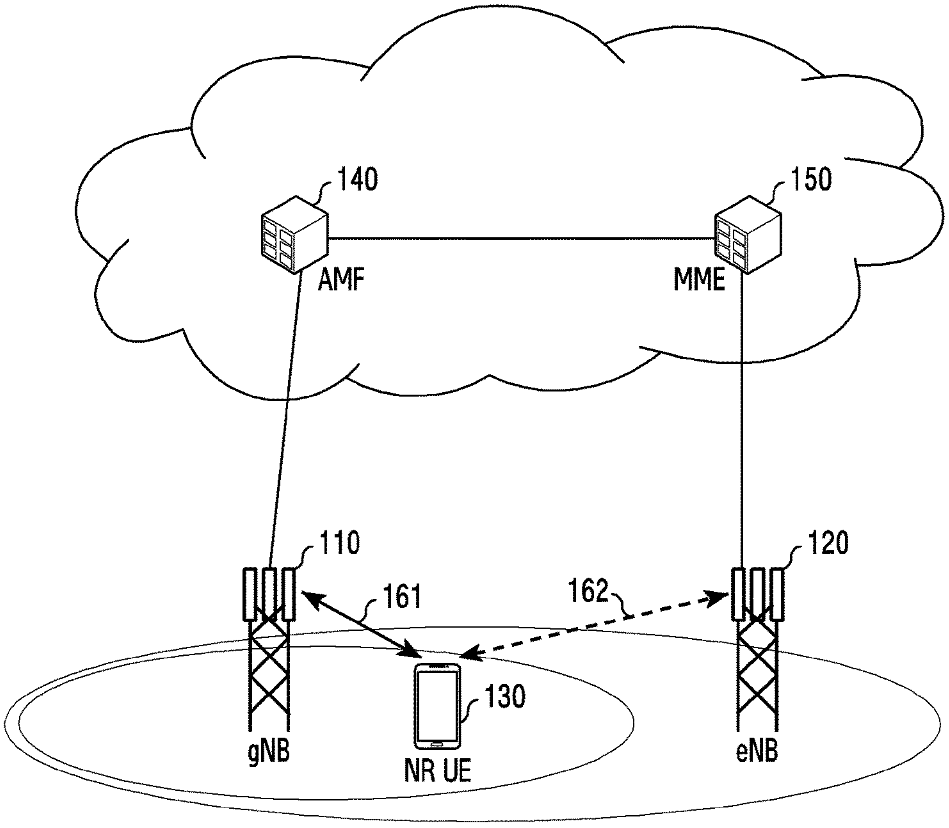
[Fig. 2]
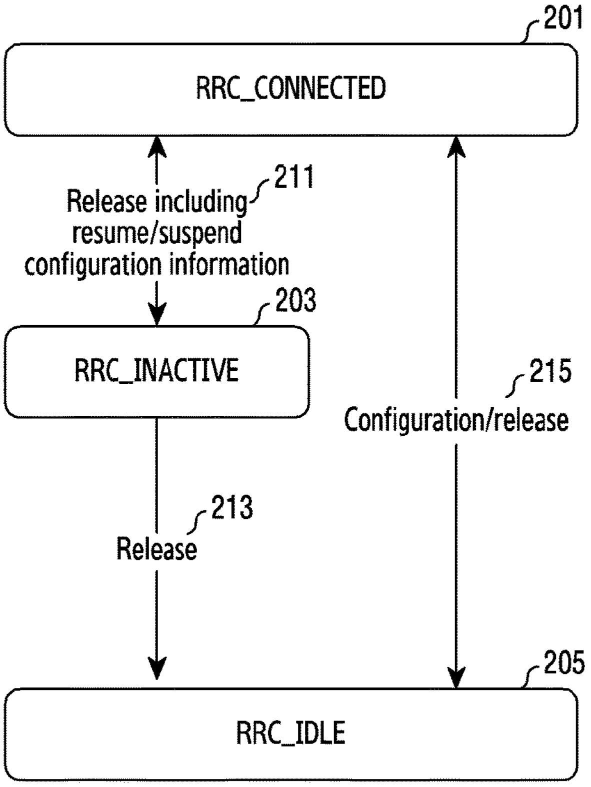

[Fig. 3]
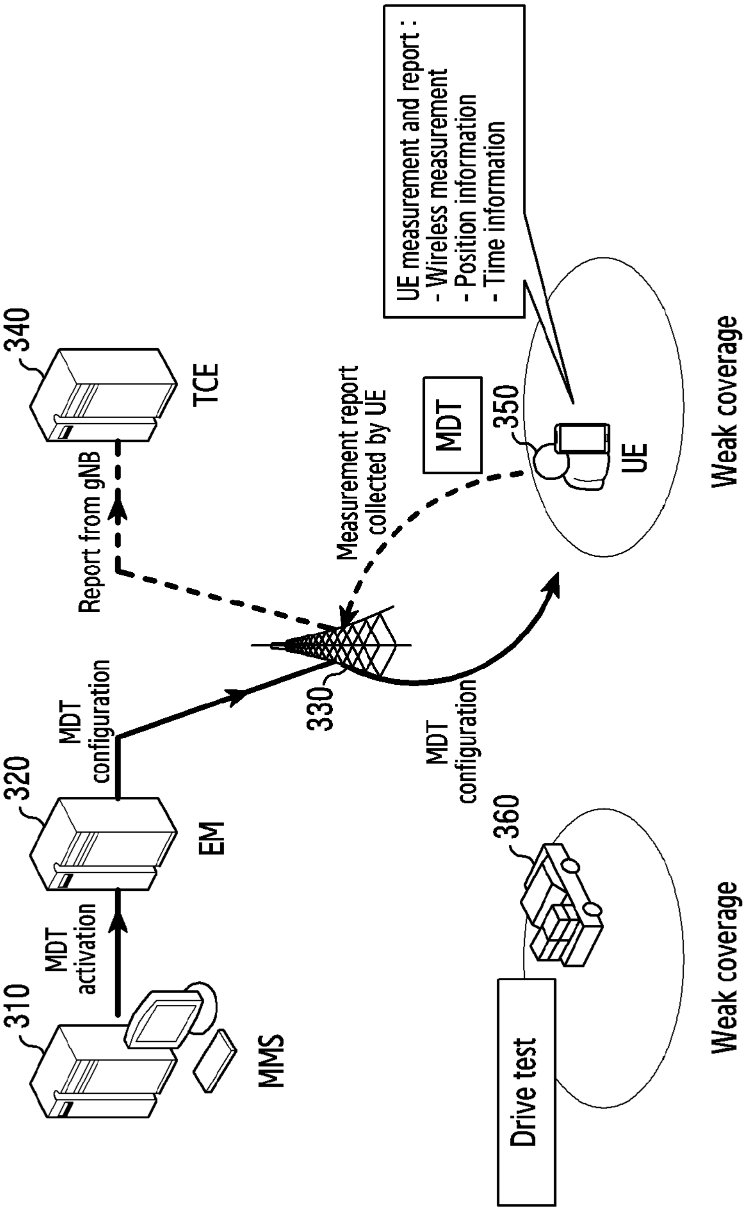

[Fig. 4]
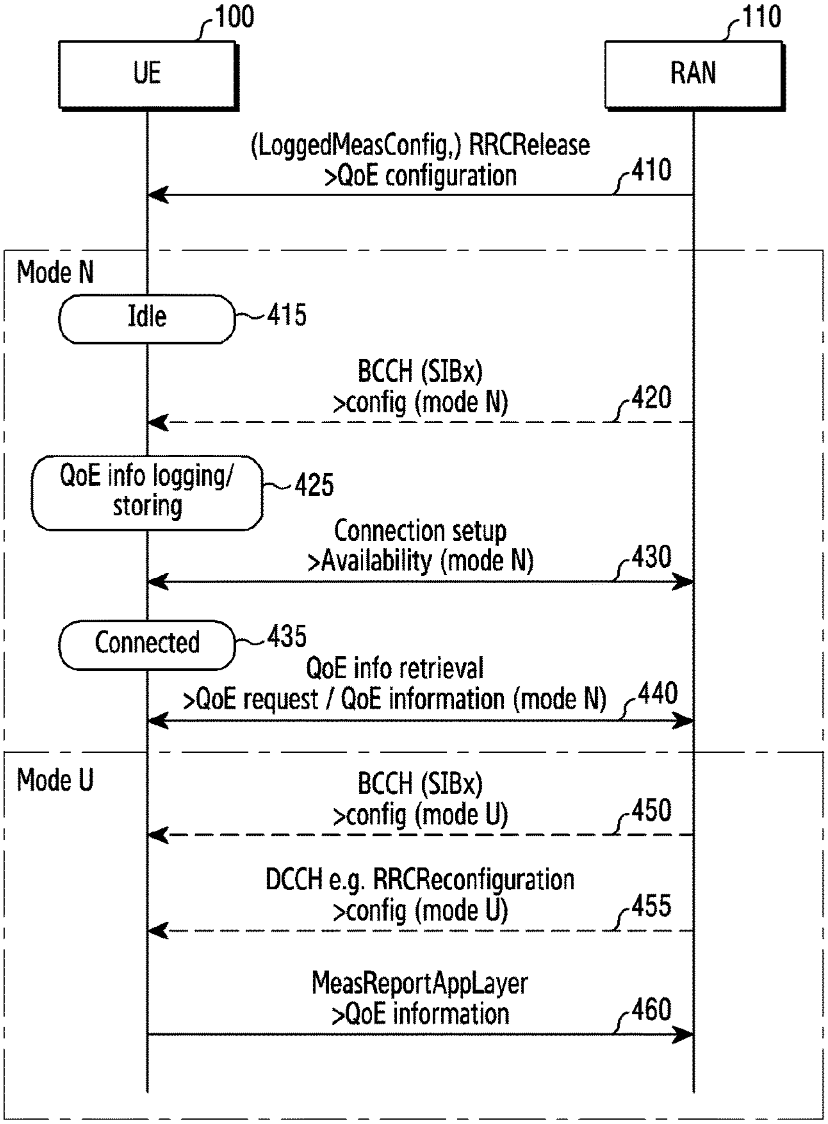
[Fig. 5]
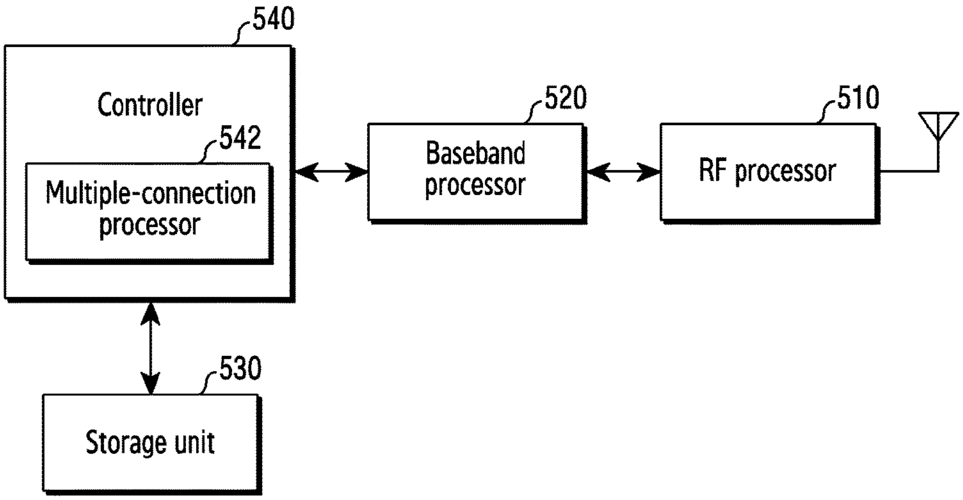

[Fig. 6]
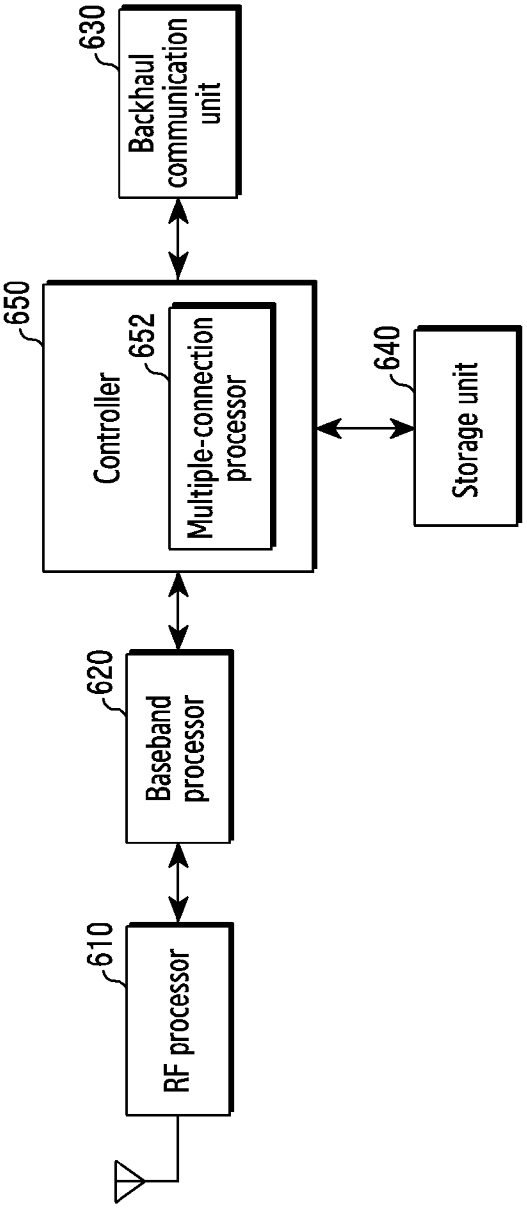

METHOD AND APPARATUS FOR A MINIMIZATION OF DRIVE TEST IN A WIRELESS COMMUNICATION SYSTEM

TECHNICAL FIELD

The present disclosure relates to generally wireless communication system and, more specifically, the present disclosure relate to a Minimisation of Drive Test, MDT, in a wireless communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The present disclosure provides method and apparatus for a MDT in a wireless communication system.

Solution to Problem

The present disclosure provides method and apparatus for a MDT in a wireless communication system.

In an embodiment, a method of performing Minimising Drive Test (MDT) of a user equipment (UE) in a wireless communication system is provided. The method comprises: receiving, from a base station, a configuration including inter radio access technology (IRAT) frequencies; performing measurement on available IRAT frequencies based on the configuration; and logging the measurement results.

Advantageous Effects of Invention

According to the embodiments of the present invention, method and apparatus for a MDT in a wireless communication system is provided.

BRIEF DESCRIPTION OF DRAWINGS

FIG. 1 illustrates a wireless communication system according to various embodiments.

FIG. 2 illustrates a transition of a wireless connection state in a wireless communication system according to various embodiments.

FIG. 3 illustrates collection and reporting of exemplary cell measurement information in a wireless communication system in accordance with various embodiments.

FIG. 4 illustrates representative message exchanges in accordance with various embodiments.

FIG. 5 illustrates the configuration of a terminal in a wireless communication system according to various embodiments.

FIG. 6 illustrates the configuration of a base station in a wireless communication system according to various embodiments.

BEST MODE FOR CARRYING OUT THE INVENTION

The present disclosure provides method and apparatus for a MDT in a wireless communication system.

In an embodiment, a method of performing Minimising Drive Test (MDT) of a user equipment (UE) in a wireless communication system is provided. The method comprises: receiving, from a base station, a configuration including inter radio access technology (IRAT) frequencies; performing measurement on available IRAT frequencies based on the configuration; and logging the measurement results.

In an embodiment, the performing the measurement may comprise: performing measurement on frequencies not indicated on System Information, SI, as candidates for cell re-selection.

In an embodiment, the frequencies not indicated on System Information, SI may comprise New Radio, NR, frequencies not included in system information block 4 (SIB4) and IRAT frequencies not in SIB5.

In an embodiment, a message from the base station may include a field indicating that the UE shall further log measurement results for the frequencies not in SIB4 or SIB5 including at least one option of:

Either by separate fields for interFreq and IRAT frequencies, or by one field covering both interFreq and IRAT; or Either by a field(s) in LoggedMeasurementConfiguration or by a field in SIB1.

In an embodiment, the method further comprises: retrieving logging MDT results from nonCR frequencies, and the UE may indicate availability if logging results by one of:

a) Re-using existing availability indication and always consider logging results for nonCR frequencies when setting this field;

b) Introducing a field in system information/broadcast indicating whether the base station supports logging for nonCR frequencies; or c) Introducing a field to indicate availability of logging results for nonCR frequencies.

In an embodiment, the method further comprises: reporting logging results for nonCR frequencies using the UEInformationResponse message, whereby separating the results of nonCR frequencies is achieved by:

a) Re-use existing ASN.1;

b) Introduce a separate field in LogMeasInfo-r16 for non-SIB4 or non-SIB5 frequencies c) Introduce a separate field in LogMeasReport-r16 carrying logged measurement entries containing results for non-SIB4 or non-SIB5.

In an embodiment, a method of Quality of Experience, QoE, reporting, of a User Equipment (UE) in a wireless communication system is provided. The method comprises: reporting, to a base station, the QoE in at least one of first mode or second mode, wherein, the first mode is Mode N, where the base station initiates retrieval, and the second mode is Mode U, where the UE initiates transfer upon arrival from upper layers.

In an embodiment, in the first mode, the base station may control data transfer and can limit the transfer in case of congestion.

In an embodiment, in connected mode, the UE may provide assistance information to the base station, and the assistance information may be provided when at least one of:

a) additional QoE information becomes available b) if the number of QoE information entries exceeds a first threshold, Thresh1 c) if the size of additional QoE information exceeds a second threshold, Thresh2 d) the assistance information listed in a) to c) is either across all different QoE information categories or service types; or per individual QoE information category or service type.

In an embodiment, in the second mode and in connected mode, the reporting may be achieved by at least one of:

a) Introducing a message specific for transfer of QoE information in mode U; and b) For transfer of QoE information, use the same message for both the first and the second modes.

In an embodiment, the transfer may be limited by one of:

a) Use of broadcast signalling b) Use of dedicated signalling c) A combination of a) and b) above.

In an embodiment, in case the base station sets an overall limitation of data transfer across all different QoE information categories or service types and/or if the UE has more QoE information than it can transfer according to the limitation set by the base station, the UE may prioritise which information to transfer and stores the remaining QoE information for transfer at a later point in time.

In an embodiment, the data to be transferred may be prioritised according to one of:

a) Transfer eldest information first;

b) Transfer most recent information first;

c) Transfer information in priority order with the highest priority first; and d) a combination of a) to c) above.

In an embodiment, the method further comprises: signalling a configuration for the QoE using delta signalling upon either transition to or from connected mode, or upon UE mobility including IRAT change.

In an embodiment, the method further comprises: managing the QoE related log MDT configuration for the UE in Multi-RAT Dual Connectivity (MRDC) comprising at least one of:

all configuration is set by Master Node, MN, and all results are transferred to MN;
some results that are transferred to MN may be forwarded to a Secondary Node, SN;
some results are transferred to SN directly;
some configuration may be set by SN; and
the configuration may originally be set by a first node and later be handled by another node.

MODE FOR THE INVENTION

Other technical features may be readily apparent to one skilled in the art from the following figures, descriptions, and claims.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

A User Equipment, UE, that is in an idle or inactive mode may be configured to perform measurement logging for the purpose of Minimising Drive Test, MDT. This is referred to as logged MDT. Typically, the UE performs periodic logging of the measurements it has available, but in New Radio, NR, a fifth generation, 5G, standard, the UE can also be configured to log measurements of particular events e.g. when an Out Of Service condition is met.

Some constraints can be defined regarding when the UE should perform logging e.g. for a limited duration or only when in a particular area (i.e when camping on a cell that is part of an area that the network can set as part of the MDT configuration).

It is furthermore possible for network to specify constraints regarding what the UE shall log. In Long Term Evolution, LTE, for example, the UE can be configured to log particular Multimedia Broadcast Multicast Services, MBMS, results for a particular frequency. In NR, the network can also configure a list of neighbouring frequencies for which the UE should log results. When the UE does not have results for the target frequency, the UE behaviour is different in LTE and NR. In LTE, the UE omits a periodic logging entry while in NR, the UE still adds a logging entry even if this only includes results of the serving cell.

There are two different types of logged MDT—signalling and management based. Signalling based MDT applies when the Core Network, CN, indicates a particular UE for which information is to be collected i.e. by IMSI, IMEI-SV, etc. Otherwise the Radio Access Network, RAN, selects the UEs for collecting measurements (management based). In the latter case, the RAN can configure many UEs and it does not pose a large problem if a particular UE cannot provide the requested info if, for instance, it experiences In Device Coexistence, IDC, problems.

Network signalling and overall control of MDT is described in the 3GPP specification TS 32.422. The request can include a list of Public Land Mobile Networks, PLMNs, an area and a list of measurement types that can be one of following:

M1 (by UE): RSRP and RSRQ measurements
M2 (by UE): Power Headroom measurements
M3 (by RAN node): Received Interference Power measurements
M4 (by RAN node): Data Volume measurements for DL and UL, per QCI per UE
M5 (by RAN node): Scheduled IP Throughput, per RAB per UE and per UE for the DL, per UE for the UL
M6 (by UE and RAN node): Packet Delay measurement, separately for DL and UL, per QCI per UE
M7 (by RAN node): Packet Loss rate measurement, separately for DL and UL per QCI per UE
M8 (by UE): RSSI measurement by UE
M9 (by UE): RTT measurement by UE For some of these measurement types (e.g. M1, M8) the RAN should provide results per frequency. The RAN may configure measurements on one or more frequencies and it should be noted that it is up to the RAN to decide which, as the request from the CN does not include any information regarding this. It is noted that for MBMS, the target frequency can be included in the request, but this is regarded as exception.

The concept of Early Measurement Reporting, EMR, has been defined. This is when a UE can be configured to provide results of measurements performed when in an idle or inactive state when (re-)connecting to the network, including resumption or reactivation. This mechanism can be used by the network to (re-)configure Secondary Cells, SCells, as well as the Secondary Cell Group, SCG, upon such (re-)connection cases. It should be noted that SCells may be configured on a frequency that is not used for camping i.e. frequencies for which the network is not broadcasting certain system information i.e. system information to control cell re-selection e.g. an NR network can provide in System Information Block 4, SIB4, (SIB4 contains information relevant for inter-frequency cell re-selection (i.e. information about other NR frequencies and inter-frequency neighbouring cells relevant for cell re-selection), which can also be used for NR idle/inactive measurements) and SIB5 (SIB5 contains information relevant only for inter-RAT cell re-selection i.e. information about E-UTRA frequencies and E-UTRAs neighbouring cells relevant for cell re-selection). A UE configured to perform EMR may thus not only perform the regular measurements for cell re-selection but also perform measurements on some further frequencies not used for camping The network can configure a Release-16 (REL-16) UE to perform measurements in idle/inactive mode, of which the latest available results can be transferred upon transition to connected. This is herein referred to as Early Measurement Reporting, EMR results. EMR results may cover frequencies used for cell re-selection, for which the network provides parameters controlling cell re-selection in SIB. For instance, in NR, SIB4 covers inter-frequency re-selection while SIB5 covers inter-RAT reselection. EMR may however also cover other frequencies i.e. frequencies not used for camping but purely to configure SCells on i.e. when using Carrier Aggregation (CA) or Dual Connectivity (DC) for a UE.

In REL-16, logging of measurement results for such non-cell reselection frequencies is not supported. For REL-17, it has, however, agreed, that logging is to be supported for such non-camping frequencies. In the following, such non-cell reselection, nonCR, frequencies, for which the UE may have results available based on EMR, shall be referred to as nonCR frequencies. The term, nonSIB frequencies, shall also be used, but note that the SIB may include EMR configuration for the concerned frequencies i.e. it is merely that concerned frequencies are not included in the list of frequencies to consider for re-selection, as in SIBs.

The prior art reveals several issues which embodiments of the present invention aim to address. These problems include: determining how the network configures the UE to perform logging for nonCR frequencies (on/off control); how results are retrieved for nonCR frequencies; and what, if any, UE capabilities need to be introduced.

Some more specific issues include how to use the field defining the inter-frequency targets and whether to introduce a similar field for Inter-RAT, IRAT, frequencies. Further, should introduce flag(s) be introduces by which the network can control handling for nonCR frequencies, and whether to include this in SIB or in LoggedMeasurementConfiguration i.e. cell and or UE specific control.

Another issue is whether the flag should be used in combination with the field defining target frequencies.

Another issue is whether availability indication should be controlled by a flag that may be introduced, or to introduce separate availability indications.

Another issue is whether inclusion of results should be controlled by a flag that may be introduced, or whether to introduce a separate UE information request field.

Another issue is whether results of nonCR frequencies should be separated in UE information response and if so, how this should be done.

Another issue is how to specify the UE capabilities.

It is an aim of embodiments of the present invention to address these and other problems in the prior art, whether mentioned herein or not.

According to the present invention there is provided an apparatus and method as set forth in the appended claims. Other features of the invention will be apparent from the dependent claims, and the description which follows.

According to a first aspect of the present invention, there is provided a method of performing Minimising Drive Test, MDT, in a wireless communication system, comprising the steps of the network configuring IRAT frequencies for which a User Equipment, UE, shall log available measurement results.

In an embodiment, the UE logs results of frequencies not indicated on System Information, SI, as candidates for cell re-selection.

In an embodiment, the frequencies not indicated on System Information, SI comprise New Radio, NR, frequencies not included in SIB4 and IRAT frequencies not in SIB5.

In an embodiment, a message from the network includes a field indicating that the UE shall log available measurement results also for frequencies not in SIB4 or SIB5 including one of the following options:

Either by separate fields for interFreq and IRAT frequencies, or by one field covering both interFreq and IRAT; and Either by a field(s) in LoggedMeasurementConfiguration or by a field in SIB1.

According to a second aspect of the present invention, there is provided a method of retrieving logging MDT results from nonCR frequencies comprising a step of the UE indicating availability if logging results by one of:

a) Re-using existing availability indication and always consider logging results for nonCR frequencies when setting this field;
b) Introducing a field in system information/broadcast indicating whether network supports logging for nonCR frequencies; or
c) Introducing a field to indicate availability of logging results for nonCR frequencies.

According to a third aspect of the present invention, there is provided a method of reporting logging results for nonCR frequencies using the UEInformationResponse message, whereby separating the results of nonCR frequencies is achieved by:

a) Re-use existing ASN.1;
b) Introduce a separate field in LogMeasInfo-r16 for non-SIB4 or non-SIB5 frequencies
c) Introduce a separate field in LogMeasReport-r16 carrying logged measurement entries containing results for non-SIB4 or non-SIB5.

According to a fourth aspect of the present invention, there is provided a method of Quality of Experience, QoE, reporting, from a User Equipment, UE, in a wireless communication system, wherein such reporting is arranged to occur in one of two modes:

a first mode, Mode N, where the network initiates retrieval; and a second mode, Mode U, where the UE initiates transfer upon arrival from upper layers.

In an embodiment, in the first mode, the network controls data transfer and can limit the transfer in case of congestion.

In an embodiment, in connected mode, the UE provides assistance information to the network, wherein the assistance information is provided when at least one of:

a) additional QoE information becomes available b) if the number of QoE information entries exceeds a first threshold, Thresh1 c) if the size of additional QoE information exceeds a second threshold, Thres2 d) the assistance information listed in a) to c) is either across all different QoE information categories or service types; or per individual QoE information category or service type In an embodiment, in the second mode, in connected mode, wherein the reporting is achieved by at least one of:

a) Introducing a message specific for transfer of QoE information in mode U; and b) For transfer of QoE information, use the same message for both the first and the second modes.

In an embodiment, the transfer is limited by one of:

a) Use of broadcast signalling b) Use of dedicated signalling c) A combination of a) and b) above In an embodiment, in case the network sets an overall limitation of data transfer across all different QoE information categories or service types and/or if the UE has more QoE information than it can transfer according to the limitation set by the network, the UE prioritises which information to transfer and stores the remaining QoE information for transfer at a later point in time.

In an embodiment, the data to be transferred is prioritised according to one of:

a) Transfer eldest information first;

b) Transfer most recent information first;

c) Transfer information in priority order with the highest priority first; and d) a combination of a) to c) above.

According to a fifth aspect of the present invention, there is provided a method of signalling a configuration for QoE using delta signalling upon either transition to or from connected mode; or upon UE mobility including IRAT change.

According to a sixth aspect of the present invention, there is provided a method of managing QoE related log MDT configuration for a UE in Multi-RAT Dual Connectivity, MRDC, comprising at least one of:

all configuration is set by Master Node, MN, and all results are transferred to MN;

some results that are transferred to MN may be forwarded to a Secondary Node, SN;

some results are transferred to SN directly;

some configuration may be set by SN; and the configuration may originally be set by a first node and later be handled by another node.

According to a seventh aspect of the present invention, there is provided apparatus arranged to perform the method of any preceding aspect. The apparatus may include one or more network element, such as UE or RAN.

Embodiments of the present invention permit the general use of network initiated retrieval in connected mode. Some key benefits for such an approach include:

1. One mechanism for idle or inactive and connected, thereby reducing network complexity
2. If used generally, the network can control the retrieval and any further mechanisms to avoid overload by QoE information, such as an additional pause mechanism, can be avoided.

Embodiments of the invention furthermore provides several different options reflecting different trade offs between:

Complexity e.g. more signalling changes may result in additional complexity for UE and network implementations Flexibility e.g. more signalling changes may result in more network control or additional flexibility e.g. better control of which information the UE should signal.

FIG. 1 illustrates a wireless communication system according to various embodiments.

Each of base stations 110 and 120 is a network infrastructure element that provides radio access to a terminal 130. Each of the base stations 110 and 120 has coverage defined as a constant geographic area based on the distance over which it is possible to transmit a signal. The base station 110 may be referred to as an "access point (AP)," a "5e-generation node (5G node)," a "wireless point," a "transmission/reception point (TRP)," or using another term having an equivalent technical meaning, in addition to "base station". In addition, the base station 120 may be referred to as an "access point (AP)," an "eNodeB (eNB)," a "wireless point," a "transmission/reception point," or using other terms having an equivalent technical meaning, in addition to "base station".

The terminal 130 is a device used by a user, and performs communication via a radio channel with the base station 110 or the base station 120. In some cases, the terminal 130 may be operated without user intervention. That is, the terminal 130 may be a device that performs machine-type communication (MTC) and might not be carried by a user. The terminal 130 may be referred to as a "user equipment (UE)," "mobile station," "subscriber station," "remote terminal," "wireless terminal," "user device," or using some other term having an equivalent technical meaning, in addition to "terminal".

Referring to FIG. 1, a radio access network of a next-generation wireless communication (new radio (NR)) system may include a next-generation base station (new radio node B, hereinafter gNB) 110 and access and mobility management (AMF) 140, which is the configuration of a core network of NR. The terminal (NR user equipment, NR UE) 130 accesses the external network through the gNB 110 and the AMF 140.

As shown in FIG. 1, the gNB 110 corresponds to an evolved node B (eNB) 120 of an existing long term evolution (LTE) system. The gNB 110 is connected to the NR UE 130 through a radio channel 161 and can provide service with performance superior to that of the eNB 120. In the next-generation mobile communication system, since all user traffic is serviced through a shared channel, a device that collects state information such as buffer states, available transmission power states, and channel states of terminals and performs scheduling is required. The above-described functions may be performed by the gNB 110. One gNB generally controls a plurality of cells. In order to implement ultra-fast data transmission compared to the LTE system, a bandwidth greater than or equal to the existing maximum bandwidth may be used in the NR system, and beamforming technology may be combined with orthogonal frequency-division multiplexing (OFDM). In addition, an adaptive modulation and coding (AMC) method for determining a modulation scheme and a channel-coding rate based on the channel state of a terminal is applied. The AMF 140 performs functions such as mobility support, bearer configuration, and QoS configuration. The AMF 140 is a device in charge of various control functions as well as a mobility management function for a terminal, and may be connected to a plurality of base stations. In addition, the NR system may also be linked with the LTE system, and the AMF 140 is connected to a mobility management entity (MME) 150 and a network interface. The MME 150 is connected to the eNB 120, which is an LTE base station. A terminal supporting LTE-NR dual connectivity may transmit and receive data while maintaining a connection to the eNB 120 as well as the gNB 110 (161, 162).

FIG. 2 illustrates a transition of a wireless connection state in a wireless communication system according to various embodiments.

Referring to FIG. 2, there are three types of radio access control (RRC) in the NR system. The connected mode (RRC_CONNECTED) 201 refers to a wireless connection state in which a terminal can transmit and receive data. The idle mode (RRC_IDLE) 205 refers to a radio access state in which the terminal monitors whether paging is transmitted to the terminal itself. The above two modes are also applied in an LTE system. Therefore, the detailed description of the two modes described above is the same as that of the LTE system. In the NR system, an inactive mode (RRC_INACTIVE) 203 is newly defined. In the inactive mode, a terminal context is maintained for the base station and the terminal, and radio access network (RAN)-based paging is supported. Features of the inactive mode are described below.

- Cell re-selection mobility;
- Core network (CN) for the terminal-NR RAN connection (control plane and user plane) is established;
- The terminal access stratum (AS) context is stored in at least one of the gNB and the terminal;
- Paging is initiated by NR RAN;
- RAN-based notification area is managed by NR RAN;
- NR RAN knows the RAN-based notification area to which the terminal belongs.

The new inactive mode may transition to a connected mode or an idle mode using a specific procedure. According to the resume process, the mode is switched from the inactive mode to the connected mode, and the connected mode is switched to the inactive mode through a release procedure including suspension configuration information (211). The above-described procedure consists of one or more steps for transmitting and receiving one or more RRC messages between the terminal and the base station. In addition, it is possible to switch from the inactive mode to the idle mode through a release procedure after resuming (213). Switching between the connected mode and the idle mode is performed according to the existing LTE technology. That is, switching between a connected mode and an idle mode is accomplished through an establishment or release procedure (215).

FIG. 3 illustrates collection and reporting of exemplary cell measurement information in a wireless communication system in accordance with various embodiments.

When establishing or optimizing a network, a mobile communication service provider generally measures signal strength in an expected service area and performs a procedure of deploying or readjusting base stations in the service area based on the measurement result. The provider loads signal measurement equipment into a vehicle and collects cell measurement information in the service area, which is time-consuming and expensive. Since the above-described procedure generally uses a vehicle, the procedure is commonly referred to as a drive test. In order to support operations such as cell reselection or handover or adding a serving cell when moving between cells, the terminal is equipped with a function for measuring a signal with respect to a base station. Therefore, instead of the drive test, a terminal in the service area can be utilized. As described above, the test using the terminal is referred to as a minimization of drive test (MDT). The provider may be configured to perform MDT operation using specific terminals through various configuration devices of the network. Accordingly, the terminals collect and store signal strength information from the serving cell and neighboring cells in the connected mode (RRC_CONNECTED), the idle mode (RRC_IDLE), or the inactive mode (RRC_INACTIVE). In addition, various information such as location information, time information, and signal quality information may be stored. The stored information is reported to the network and transmitted to a specific server when the terminals operate in the connected mode.

MDTs are classified into immediate MDT and logged MDT.

The immediate MDT is characterized in that the terminal immediately reports the collected information to the network. Since the information should be reported immediately, the immediate MDT can be performed by a terminal operating in connected mode. In general, radio resource management measurement (RRM) processes to support operations such as handover and serving cell addition are performed again, and location information and time information are additionally reported.

The logged MDT is characterized in that the information collected by the terminal is stored immediately without being reporting to the network, and the stored information is reported after the terminal is switched to the connected mode. In general, the logged MDT is performed by a terminal in an idle mode, in which it is impossible to immediately report the collected information to the network. The terminal in the inactive mode introduced in the NR system performs the logged MDT. When a specific terminal is in a connected mode, configuration information for performing the logged MDT operation is provided to the terminal. After switching to the idle mode or the inactive mode, the terminal collects and stores the configuration information. In the following Table 1, the RRC state classification of the terminal capable of performing the corresponding MDT according to the MDT type is described.

TABLE 1

| MDT type | RRC state |
|---|---|
| Immediate MDT | RRC_CONNECTED |
| Logged MDT | RRC_IDLE or RRC_INACTIVE |

FIG. 4 illustrates representative message exchanges in accordance with various embodiments.

Embodiments of the invention provide a solution for handling the logging and subsequent retrieval of measurement results of NR frequencies not included in SIB4 and IRAT frequencies not in SIB5, for which the UE may have results available based on the EMR measurements it performs.

An embodiment of the invention relates to the specification of IRAT target frequencies, whereby a field is introduced by which the network can configure the IRAT target frequencies for which UE shall log available measurement results.

An example of the corresponding ASN.1 extract is shown below, with the additional content underlined:

```
AreaConfiguration-r16 ::=          SEQUENCE {
    areaConfig-r16              AreaConfig-r16,
    interFreqTargetList-r16         SEQUENCE(SIZE (1..maxFreq)) OF InterFreqTargetInfo-r16
OPTIONAL -- Need R
}
AreaConfiguration-v17xy ::=      SEQUENCE {
    irat-TargetFreqListEUTRA-r17       SEQUENCE(SIZE (1..maxFreq)) OF ARFCN-ValueEUTRA
OPTIONAL -- Need R
}
```

A further embodiment introduces means by which the network can control whether the UE logs results of frequencies not indicated on SI as candidates for cell re-selection e.g. NR frequencies not included in SIB4 and IRAT frequencies not in SIB5. Although the UE will not measure concerned frequencies for cell re-selection, it may have results available e.g. based on EMR measurements it performs.

The field indicating target frequencies may be used to log frequencies not listed in SIB4 and SIB5 only if the network explicitly configures or lists the specific NR and IRAT target frequencies i.e. the feature is only supported if the network specifies target frequencies i.e. the concerned field is required for the network to set.

Further, a field is introduced indicating that the UE shall log available measurement results also for frequencies not in SIB4 or SIB5 (flag), including the following options: either by separate fields for interFreq (NR) and IRAT frequencies, or by one (common) field covering both interFreq (NR) and IRAT; or either by a field(s) in LoggedMeasurementConfiguration or by a field in SIB1.

It is noted that the two options, above have somewhat different properties. In the first option, per cell control is possible which may useful when some parts of the network support the feature while others do not. In the second option, per UE control is possible where the network can order that some of the UEs that are logging measurement results also include results of nonCR frequencies, if available.

Further, if the network configures both the target frequencies and a field controlling reporting for nonCR frequencies (flag), the following options apply regarding use of the two fields: the UE does not use or ignores the flag if target frequencies are specified i.e. the network shall include nonCR frequencies in the field specifying target frequencies, if provided; or the UE uses the flag if target frequencies set by network does not include nonCR frequencies and not used or ignored otherwise.

An example of the corresponding ASN.1 extract is shown below, with the additional content underlined:

```
LoggedMeasurementConfiguration-r16-IEs ::= SEQUENCE {
    traceReference-r16                  TraceReference-r16,
    traceRecordingSessionRef-r16            OCTET STRING (SIZE (2)),
    tce-Id-r16                      OCTET STRING (SIZE (1)),
    absoluteTimeInfo-r16                AbsoluteTimeInfo-r16,
    areaConfiguration-r16               AreaConfiguration-r16           OPTIONAL, --Need R
    plmn-IdentityList-r16               PLMN-IdentityList2-r16          OPTIONAL, --Need R
    bt-NameList-r16                 SetupRelease {BT-NameList-r16}      OPTIONAL, --Need M
    wlan-NameList-r16                   SetupRelease {WLAN-NameList-r16}    OPTIONAL, --Need M
    sensor-NameList-r16                 SetupRelease {Sensor-NameList-r16} OPTIONAL, --Need M
    loggingDuration-r16                 LoggingDuration-r16,
    reportType                      CHOICE {
        periodical                  LoggedPeriodicalReportConfig-r16,
        eventTriggered                  LoggedEventTriggerConfig-r16,
        ...
    },
    lateNonCriticalExtension                OCTET STRING            OPTIONAL,
    noncriticalExtension            LoggedMeasurementConfiguration-v17xy-IEs     OPTIONAL
}
LoggedMeasurementConfiguration-v17xy-IEs ::= SEQUENCE {
    areaConfiguration-rv17xy            AreaConfiguration-v17xy         OPTIONAL, --Need R
    nonCriticalExtension                SEQUENCE { }                OPTIONAL
}
AreaConfiguration-v17xy ::=      SEQUENCE {
    irat-TargetFreqListEUTRA-r17       SEQUENCE(SIZE (1..maxFreq)) OF ARFCN-ValueEUTRA
OPTIONAL, -- Need R
    logNonCR-Freqs-r17          ENUMERATED{true}                OPTIONAL -- Need N
}
SIB1-v1630-IEs ::=          SEQUENCE {
    uac-BarringInfo-v1630       SEQUENCE {
        uac-AC1-SelectAssistInfo-r16    SEQUENCE (SIZE (2..maxPLMN)) OF UAC-AC1-SelectAssistInfo-
r16
    }                                           OPTIONAL, -- Need R
    nonCriticalExtension            SIB1-v17xy-IEs                  OPTIONAL
}
SIB1-v17xy-IEs ::=          SEQUENCE {
```

-continued

```
    logNonCR-Freqs-r17          ENUMERATED{ true}           OPTIONAL, -- Need N
    nonCriticalExtension        SEQUENCE { }                        OPTIONAL
  }
```

In order to retrieve logging results for nonCR frequencies, there are several aspects involved:

1. Whether to introduce field(s) indicating whether network supports logging of nonCR frequencies
2. Whether to introduce additional field(s) indicating availability of logging results for nonCR frequencies
3. Whether to introduce additional field(s) by which network can requesting UE to provide logging results for nonCR frequencies
4. Setting availability indication and contents of UEInformationResponse depending on fields in points 1. to 3. above.

Further, embodiments of the invention clarify retrieval of results of nonCR frequencies logged by the UE, covering availability indication, retrieval request and setting contents of the UEInformationResponse message.

There are various options for reporting availability of logging results for nonCR frequencies:

a) Re-use existing availability indication and always consider logging results for nonCR frequencies when setting this field i.e. may also be set when UE only has results for nonCR frequencies
b) Introduce afield in system information/broadcast indicating whether the network supports logging for nonCR frequencies. Only if the field indicates network support, the UE considers logging results for nonCR frequencies when setting availability indication. i.e. the field can avoid retrieval by network not supporting nonCR frequencies. This may be done either by separate fields for interFreq (NR) and IRAT frequencies, or by one (common) field covering both interFreq (NR) and IRAT
c) Introduce an additional field to indicate availability of logging results for nonCR frequencies. This may be done either by separate fields for interFreq (NR) and IRAT frequencies, or by one (common) field covering both interFreq (NR) and IRAT It should be noted that a UE that performs logging (timer running and in validity area), would always have results for the serving cell. The UE may have no other results i.e. neither for intra-frequency neighbours (e.g. due to s-Search) nor for inter-freq or inter-RAT frequencies (e.g. not detected or due to s-Search). It is understood that in such a case, the UE will anyhow create an entry in the variable containing the logged measurements. i.e. legacy availability indication is set even if only serving results are available.

When there is no separate validity area for nonCR frequencies, the foregoing means that when the UE logs results for nonCR frequencies, according to the current specification, the UE would also always have results for legacy (CR) frequencies available. From this perspective, changes regarding availability indication seem inappropriate.

One option would be to change setting of availability i.e. that a new UE sets it to true only if the UE has results other than for serving. However, it is not entirely clear that this is desirable i.e. networks may still want to have a log indicating just serving results because the network may still derive some info from it. So one option is that the new field, referred to in option 2, above, may only control inclusion of results in UEInformationResponse.

Further, a UE supporting logging results for nonCR frequencies may set availability indication in a modified manner:

a) If the UE has no results of neighbouring cells on legacy or CR frequencies (i.e. only has results for serving frequency), the UE considers that it has no results for legacy or CR frequencies
b) the UE applies the above approach in several cases: when neither a flag is introduced in system information (controlling whether nonCR frequencies affect setting of availability) nor an additional availability indicator is introduced for nonCR; or when a flag is introduced in system information (controlling whether nonCR frequencies affect setting of availability); or when an additional availability indicator is introduced for nonCR.
c) the UE may apply the above approach depending on whether it has results for nonCR frequencies e.g. only when it has results for such nonCR frequencies Further, there are several options for setting contents of UEInformationResponse:

a) Re-use existing request field and UE always includes logging results for nonCR frequencies in UEInformationResponse
b) Introduce a field in system information/broadcast indicating whether the network supports logging for nonCR frequencies. Only if the field indicates network support, the UE includes logging results for nonCR frequencies in UEInformationResponse. i.e. the field can avoid retrieval by network not supporting nonCR frequencies. This is either by separate fields for interFreq (NR) and IRAT frequencies, or by one (common) field covering both interFreq (NR) and IRAT
c) Introduce an additional request field by which the network can explicitly request the UE to include logging results for nonCR frequencies in UEInformationResponse. This is either by separate fields for interFreq (NR) and IRAT frequencies, or by one (common) field covering both interFreq (NR) and IRAT.

Further, an embodiment may support any combination of options for availability indication and contents of UEInformationResponse as set out above.

Further, an embodiment either uses:

a) A single or common field in system information/broadcast indicating whether network supports logging for nonCR frequencies controlling both: whether UE considers nonCR frequencies when setting the availability indication and whether UE includes results of nonCR frequencies in UEInformationResponse; or
b) Separate fields in system information/broadcast indicating whether the network supports logging for nonCR frequencies i.e. a first one controlling whether UE considers nonCR frequencies for setting the availability indication and a second one controlling whether UE includes results of nonCR frequencies in UEInformationResponse, with a first field controlling whether UE considers nonCR frequencies when setting the availability indication and a second field controlling whether UE includes results of nonCR frequencies in UEInformationResponse.

It is also possible to combine the broadcast bit controlling logging of results with the broadcast bit controlling retrieval and/or which results to include in UEInformationResponse.

Further, an embodiment either uses:

a) A single or common field in system information/broadcast indicating whether network supports logging for nonCR frequencies controlling all of the following: whether the UE logs results of nonCR frequencies; whether the UE considers nonCR frequencies when setting the availability indication; and whether the UE includes results of nonCR frequencies in UEInformationResponse b) Separate fields in system information/broadcast indicating whether the network supports logging for nonCR frequencies i.e. a first field controlling whether the UE logs results of nonCR frequencies; or other field(s) controlling whether the UE considers nonCR frequencies for setting the availability indication and/or whether the UE includes results of nonCR frequencies in UEInformationResponse.

Changes to the corresponding ASN.1 are not shown here, as changes to system information/broadcast is already illustrated earlier.

For completeness, an example of changes (shown underlined) to the relevant part of the procedural specification are shown below (not covering field in system information/broadcast) as already shown in previous:

2> if the SIB1 contains idleModeMeasurementsNR and the UE has NR idle/inactive measurement information concerning cells other than the PCell available in VarMeasIdleReport; or 2> if the SIB1 contains idleModeMeasurementsEUTRA and the UE has E-UTRA idle/inactive measurement information available in VarMeasIdleReport:

3> include the idleMeasAvailable;

2> if the SIB1 contains logNonCR-FrM and the UE has logged measurements available for NR and if the RPLMN is included in plmn-IdentityList stored in VarLogMeasReport:

3> include the logMeasAvailable in the RRCSetupComplete message;

1> if the logMeasReportReq is present and if the RPLMN is included in plmn-IdentityList stored in VarLogMeasReport:

2> if VarLogMeasReport includes one or more logged measurement entries, set the contents of the logMeasReport in the UEInformationResponse message as follows:

3> include the absoluteTimeStamp and set it to the value of absoluteTimeInfo in the VarLogMeasReport;

3> include the traceReference and set it to the value of traceReference in the VarLogMeasReport;

3> include the traceRecordingSessionRef and set it to the value of traceRecordingSessionRef in the VarLogMeasReport;

3> include the tce-Id and set it to the value of tce-Id in the VarLogMeasReport;

3> include the logMeasInfoList and set it to include one or more entries from the VarLogMeasReport starting from the entries logged first, and for each entry of the logMeasInfoList that is included, include all information stored in the corresponding logMeasInfoList entry in VarLogMeasReport except the results for non-SIB frequencies;

3> if the SIB1 contains logNonCR-Freqs;

4> for each of the entries the UE included in field logMeasInfoList;

5> include results for non-SIB frequencies in field logMeasInfoList, if stored in the corresponding logMeasInfoList entry in VarLogMeasReort;

3> if the VarLogMeasReport includes one or more additional logged measurement entries that are not included in the logMeasInfoList within the UEInformationResponse message:

4> include the logMeasAvailable;

The following relates to reporting of logging results for nonCR frequencies. There are different ways in which the UE can include the logging results for nonCR frequencies in the UEInformationResponse message.

In an embodiment, there are options for separating results of nonCR frequencies:

a) Re-use existing ASN.1 b) Introduce a separate field in LogMeasInfo-r16 for non-SIB4/non-SIB5 frequencies c) Introduce a separate field in LogMeasReport-r16 carrying logged measurement entries containing results for non-SIB4/non-SIB5 frequencies (and avoid duplication e.g. by defining this as a parallel list)

A comparison of the different options is provided in following Table 2.

TABLE 2

| Option | Description | Evaluation |
|---|---|---|
| 1 | No ASN.1 changes i.e. results are merely separated by a separate entry in the per frequency list of neighboring results | Simplest and basic level of separation |
| 2 | ASN.1 changed by introducing separate list for non-SIB4 and non-SIB5 frequencies | More complex |
| 3 | ASN.1 changed by introducing separate list carrying logged measurement entries containing results for non-SIB4/non-SIB5 frequencies | Most complex i.e. assumed to be parallel list to avoid duplication of general information like time stamp, location information and so |

For completeness, an example of changes (shown underlined) to the corresponding ASN.1 is shown below

```
UEInformationResponse-r16-IEs ::= SEQUENCE {
  measResultIdleEUTRA-r16        MeasResultIdleEUTRA-r16        OPTIONAL,
  measResultIdleNR-r16           MeasResultIdleNR-r16           OPTIONAL,
```

-continued

```
    logMeasReport-r16              LogMeasReport-r16            OPTIONAL,
    connEstFailReport-r16          ConnEstFailReport-r16        OPTIONAL,
  LogMeasReport-r16 ::=            SEQUENCE {
    absoluteTimeStamp-r16            AbsoluteTimeInfo-r16,
    traceReference-r16             TraceReference-r16,
    traceRecordingSessionRef-r16     OCTET STRING (SIZE (2)),
    tce-Id-r16                     OCTET STRING (SIZE (1)),
    logMeasInfoList-r16            LogMeasInfoList-r16,
    logMeasAvailable-r16           ENUMERATED {true}          OPTIONAL,
    logMeasAvailableBT-r16           ENUMERATED {true}          OPTIONAL,
    logMeasAvailableWLAN-r16         ENUMERATED {true}           OPTIONAL,
    ...
     extensionOptionX
  }
  LogMeasInfoList-r16 ::=        SEQUENCE (SIZE (1..maxLogMeasReport-r16)) OF LogMeasInfo-r16
  LogMeasInfo-r16 ::=            SEQUENCE {
    locationInfo-r16               LocationInfo-r16          OPTIONAL,
    relativeTimeStamp-r16            INTEGER (0..7200),
    servCellIdentity-r16           CGI-Info-Logging-r16         OPTIONAL,
    measResultServingCell-r16        MeasResultServingCell-r16     OPTIONAL,
    measResultNeighCells-r16         SEQUENCE {
      measResultNeighCellListNR        MeasResultListLogging2NR-r16      OPTIONAL,
      measResultNeighCellListEUTRA     MeasResultList2EUTRA-r16         OPTIONAL
    },
    anyCellSelectionDetected-r16     ENUMERATED {true}           OPTIONAL
    ...
     extensionOptiony
  }
  MeasResultListLogging2NR-r16 ::= SEQUENCE(SIZE (1..maxFreq)) OF MeasResultLogging2NR-r16
  MeasResultLogging2NR-r16 ::=     SEQUENCE {
    carrierFreq-r16                ARFCN-ValueNR,
    measResultListLoggingNR-r16      MeasResultListLoggingNR-r16
  }
  MeasResultListLoggingNR-r16 ::=   SEQUENCE (SIZE (1..maxCellReport)) OF MeasResultLoggingNR-
  r16
  MeasResultLoggingNR-r16 ::=      SEQUENCE {
    physCellId-r16                 PhysCellId,
    resultsSSB-Cell-r16              MeasQuantityResults,
    numberOfGoodSSB-r16              INTEGER (1..maxNrofSSBs-r16) OPTIONAL
  }
```

Embodiments of the invention relate to UE capability. As the network should only configure the UE with features for which it indicates support, some UE capabilities need to be introduced. In an embodiment, the network should include nonSIB4 frequencies in interFreqTargetFreq only if UE supports this feature. In a further embodiment, the network should only signal target IRAT frequencies if the UE supports this feature.

An embodiment of the invention provides options regarding UE capabilities for logging results of nonCR frequencies:

a) New capability for support of interFreqTargetFreq for nonSIB4 frequencies b1) New capability for support of interRAT-TargetFreq that includes support for nonSIB5 frequencies b2) Two new capabilities i.e. one for interRAT-TargetFreq and covering support of interRAT-TargetFreq for nonSIB5 frequencies c) New (single or common) capability covering a) and b1)

Rather than introducing further UE capabilities, features can be made conditionally mandatory as follows.

Further options regarding UE capabilities for logging results of nonCR frequencies: make the feature conditionally mandatory i.e. specify that a UE that supports REL-17, logged MDT and EMR has to support:

a) interFreqTargetFreq including nonSIB4 frequencies and/or b) interRAT-TargetFreq, also including nonSIB5 frequencies Embodiments of the invention, as set out above, including the different options described, reflect different trade offs between:

Complexity e.g. more signalling changes may result in additional complexity for UE and network implementations;

Flexibility e.g. more signalling changes may result in more network control/additional flexibility e.g. better control of which information UE should signal; and Impact to legacy nodes e.g. more signalling changes may result in less impact to legacy network nodes i.e. better ways to avoid such nodes are affected by new information UE may signal.

In other words, the various different options have different benefits and drawbacks, as indicated above. However, in total, all of the embodiments offer improvements over the prior art.

A second aspect of the present invention relates to Quality of Experience, QoE, and, in particular, QoE reporting.

According to the standardisation process, a mechanism is defined by which a UE may provide information regarding quality experienced, referred to as Qualify of Experience (QoE) reporting. Such QoE reporting was introduced in the prior are in relation to LTE and the main characteristics of the mechanism defined in LTE are as follows:

Most aspects are defined by upper layers and transparent to AS layer

Reporting is done in connected mode only

UE reports whether it is capable of QoE, with separate capabilities for streaming or MTSI service types Network can setup or release the UE to perform QoE reporting by field measConfigAppLayer within Reconfiguration message. It includes service type (streaming, MTSI) as well as an octet string with NAS configuration (upto 1000 octets) as defined in annex L of 3GPP TS 26.247.

Results are reported by MeasReportAppLayer message, via a separate Signaling Radio Bearer, SRB, i.e. SRB4, and immediately upon NAS providing the concerned information. The message includes service type (streaming, MTSI) as well as an octet string with NAS information (upto 8000 octets) as defined in annex L of 3GPP TS 26.247

A study was performed regarding how to support QoE in NR and it was agreed to use the aforementioned LTE mechanism as a baseline. However, some agreements were made that involve some changes compared to LTE, with the primary ones being as follows:

the network should be able to pause QoE reporting

QoE should be supported in idle/inactive, for Multicast and Broadcast Services, MBS, purposes The following relates to Logged MDT. In brief, logged MDT e.g. as used in LTE, includes the following features:

If the network configures Log MDT, any previous configuration is overwritten the UE reports availability of log MDT upon entering connected setupComp, resumeComp, reconfigComp (includes Handover, HO, to NR), reestablishComp (e.g. by NR: UE-MeasurementsAvailable-r16), upon which, the network may retrieve the information the UE does not inform the network about whether it still has an ongoing or not expired log MDT configuration e.g. upon transition to connected. The network does not have a context for UEs that are in idle mode while the context for UEs in inactive, so far, does not include information regarding log MDT The network is not aware if timer T330 has expired (but might infer something e.g. from retrieved information). This was not essential to date, i.e. the network can simply re-assign new configuration, if desired, and the UE overwrites if T330 has not expired Logged measurement results are discarded:

48 hrs after T330 expiry

Upon overwriting either in the same or in another RAT

Upon power off or detach

Note that T330 is started upon receiving LoggedMeasurementConfiguration

For NR, some further agreements were reached including the following:

A signaling based logged MDT (sig-Log MDT) configuration should not be overwritten by a management based MDT (mgm-Log MDT) e.g. following mobility to another RAT Note that the initial assumption was that the network would handle this e.g. by source node indicating to target node whether the UE is configured with sig-Log MDT (and possibly some more information e.g. end time). Such information would be transferred also upon IRAT change (intra-PLMN), but can still only cover UEs that are in inactive/connected mode, but not UEs in idle for which the network has no context. In the end it was agreed to opt for a UE-based mechanism, with the relevant details still to be specified.

QoE reporting is not specified in NR. It is planned to be introduced as part of REL-17 of NR (NR was first specified in REL-15). Although the procedures as used in LTE are agreed to be the baseline for NR, some potential enhancements have been agreed. Hence, use of a somewhat different approach is considered.

Moreover, the table below indicates a number of AS related problems/issues that are to be resolved, some of which require further study (FFS).

TABLE 3

| | AS functionality<br>In connected | Issues/remarks |
|---|---|---|
| General | Support multiple QoE measurements, each with own config and associated results | (FFS) whether pausing is to be supported at level of individual QoE measurement and if so, how<br>What to do for SN terminated DRBs e.g. case of Multi-RAT Dual Connectivity, MRDC |
| Configuration | Actual configuration transparent to AS (octet string carrying upper layer info within by field measConfigAppLayer within Reconfiguration message) | Delta signalling upon transition to idle/inactive? |
| Reporting | Using MeasReportAppLayer message | — |
| Furthermore | — | What to do in case QoE measurement is paused e.g. store with option to retrieve at later stage |

TABLE 4

| In idle/inactive | | |
|---|---|---|
| General | Same as in connected | Same as above |
| Configuration | Similar as in connected (i.e. introduce similar field as measConfigAppLayer in LoggedMeasurementConfiguration? | Will config be same as in connected??<br>Support delta signalling upon transition to connected? |

TABLE 4-continued

| In idle/inactive | | |
|---|---|---|
| General | Same as in connected | Same as above |
| | Prioritisation of signalling over management based | Can UE either perform QoE or regular LogMDT? If so, is there prioritisation and will UE handle this (alike for signalling based MDT)? |
| Availability indication | Field logMeasAvailable can be included in several messages | — |
| Retrieval | UEInformationRequest can include logMeasReportReq. UEInformationResponse can include logMeasReport | — |
| Furthermore | — | What to do in case QoE measurement is paused e.g. store with option to retrieve at later stage? |

QoE reporting may involve a lot of signalling. In case of overload, it would be preferable if the network can, at least temporarily, stop the UE from providing QOE reports, hence it was agreed to introduce RRC signalling for this. During such a pause, the UE would not stop performing the QoE mechanism but rather temporarily store the results. Further details are, however, still to be decided.

The details of pause/resume mechanism are yet to be resolved. For instance is pause/resume for all QoE reports or per QoE configuration, how long can the UE store the reports, limit for stored reports size etc.

In case the UE stores QoE results, it seems attractive to re-use the log MDT framework in connected mode also, at least during the pause i.e. the log MDT mechanism supports storing of information and subsequent transfer following resumption. Moreover, transfer is in a network controlled manner i.e. so it is possible to avoid a signalling spike upon resumption.

It is currently unclear how to limit transfer of QoE information when the network is congested. One option is to always use the log MDT framework in connected i.e. a mode in which network initiates retrieval of QoE information and in which UE may provide assistance regarding availability of QoE information In an embodiment, options for transfer of QoE information in connected mode include the following modes:

Mode N: Network initiates retrieval (i.e. Pull based approach, same framework as used for log MDT)

Mode U: UE initiates transfer upon arrival from upper layers (i.e. Push based approach, alike used for RRM measurements and QoE reporting in LTE)

Regarding the mode for transfer of QoE information in connected, the following options are provided:

a) Use mode N always i.e. even if network is not congested
b) Use mode N only in specific cases e.g. when network indicates it is congested, with further options:
   During the congestion period
   For results stored collected during congestion
c) Use mode N only for certain categories of QoE information e.g. specific service type(s)
d) Either specify in standards in which case the UE uses the log MDT mode or introduce means by which the network can configure this (in latter case, use of the mode is up to network implementation)

The following relates to network initiated retrieval in connected (Mode N). In an embodiment, use network initiated retrieval for QoE information/results. In case the network initiates retrieval, the network controls the data transfer and can limit it in case of congestion. The congestion mechanism is however UE specific i.e. to facilitate quick retrieval when there is no congestion, the UE can provide assistance regarding changes in the QoE information that is available for network to retrieve.

In connected mode, the UE can provide assistance regarding availability of information using the following options a) Provide UE assistance whenever additional QoE information becomes available
b) Provide UE assistance if number of QoE information entries exceeds a first threshold, Thresh1
c) Provide UE assistance if size of additional QoE information exceeds a second threshold, Thres2
d) The UE assistance listed in previous options is either
   Across all different QoE information categories/service types or
   Per individual QoE information category/service type (e.g. threshold evaluated and/or configured per category)
e) Any combination
f) Reporting any of the above assistance may be guarded by a prohibit timer i.e. when providing first assistance a prohibit timer is started and further assistance is provided only after expiry of the timer. The prohibit timer may apply to a subset of the assistance.

In case the network initiates retrieval, the network can apply limitations regarding the QoE information transfer e.g. a maximum data rate, which can either be across all categories of QoE information (e.g. across all service types) or separate limitations per individual category of QoE information.

Embodiments of the invention provide options for the network to set limitations regarding the amount of available QoE information UE includes in a retrieval response:

a) Indication of which categories of QoE information the UE is allowed to transfer
b) Indication of the amount of QoE information the UE is allowed to transfer e.g. maximum size or maximum number of entries and either
   Common/across all kind of QoE information, or
   Per category of QoE information e.g. per service type
c) Combinations
d) Limitations can either be fixed (in some way defined by standard) or configurable, and if so limitation can either be General/applicable to all retrievals, or Per individual retrieval procedure (i.e. some value indicated in retrieval request)

When the network sets limitations, it is desirable if the network also can control which QoE information is transferred first.

Embodiments of the invention provide options for the network to control which available QoE information the UE transfers first:

a) Indicate priority of each category of QoE information e.g. priority of each service type
b) Define rule that the UE shall apply when determining priority of QoE information e.g. Last In First Out (LIFO), First In First Out FIFO, depending on actual transfer delay experienced e.g. priority increases when closer to a maximum permissible QoE delay. This can be defined by standards and/or involve some network configuration
c) Cover prioritisation between categories of QoE information (e.g. between service types) as well as within individual category of QoE information
d) Combinations of these options
e) all of the above can either be fixed (in some way defined by the standard) or configurable, and if the latter this can either be
General/applicable to all retrievals, or
Per individual retrieval procedure (i.e. some value indicated in retrieval request)

A further embodiment relates to UE initiated transfer in connected (Mode U). In this case, the UE initiates transfer upon arrival of QoE information from upper layers. The information may be transferred in different ways i.e. itis not used for a UE in connected mode, there may be a need for different way by which network can limit QoE reporting in case of congestion. There are two main options for UE initiated transfer of QoE information:

a) Introduce a message specific for transfer of QoE information in mode U e.g. MeasReportAppLayer message. I.e. different messages are used in the two modes (mode N and mode U)
b) For transfer of QoE information, use the same message for the two modes. E.g. in mode both modes UEInformationResponse is used or another (new) message In case network-initiated retrieval is not used for a UE in connected mode, there may be a need for a different way by which network can limit QoE reporting in case of congestion. There are several options for limiting QoE information transfer when UE initiates transfer:

c) Use of broadcast signalling (cell specific)
d) Use of dedicated signalling (UE specific)
e) A combination In an embodiment, broadcast signalling may include the following options:

a) Field/flag indicating that QoE reporting is paused
b) A probability factor i.e. UE performs random draw and if the value exceeds probability factor, the UE initiates transfer of some QoE information
c) Some limitation is to be observed when transferring QoE information e.g. a maximum data rate, a maximum number of information size or information entries
d) Previous fields/options can either be common across all kinds of QoE information, or per category of QoE information e.g. per service type
e) Combinations of the previous Dedicated signalling may be the same as indicated in the above for broadcast.

Regarding the control signalling set out above, in case mode U is used for different cases, the network may provide different parameters or values for each of the different cases. E.g. different values for QoE information collected during overload or pause and non-overload or pause.

An embodiment may include further aspects in the case of network configured data transfer limitation. In some of the previous cases, data transfer is limited rather than entirely suspended. E.g. the UE is only allowed to transfer up to a certain data rate. As mentioned, such limitation may either be across all QoE information or per category of QoE information e.g. per service type. For each case, the limitation affects the transfer of QoE information.

Options for handling QoE information in the case where the network sets overall limitation i.e. across all different QoE information categories/service types: if the UE has more QoE information than it can transfer according to the limitation set by the network, the UE prioritises which information to transfer and stores the other or remaining QoE information for transfer at later point in time i.e. it delays its transfer. Options for prioritising which information to transfer can include the following:

a) Transfer oldest information first (FIFO)
b) Transfer most recent information first (LIFO)
c) Transfer information in priority order i.e. highest priority first. This may include several options e.g.
1. In order of service type, starting from the service type with highest priority
2. Depending on actual transfer delay experienced e.g. priority increases when closer to a maximum permissible QoE delay
d) Combinations e.g. in order of service type and for a given service type, transfer most recent info first An embodiment provides options for handling QoE information in case the network sets a limitation per QoE information category or service type. If the UE has more QoE information than it can transfer according to the limitation set by network, the UE prioritises which information to transfer and stores the other or remaining QoE information for transfer at a later point in time i.e. it delays its transfer. Options for prioritising which information to transfer can include following:

a) Transfer oldest information first
b) Transfer most recent information first
c) Transfer information in priority order i.e. highest priority first Anyhow, in such a case, there may be a need to decide which information is transferred i.e. some prioritisation may need to be performed. AS is not aware of the contents of the QoE information, so if contents should affect priority, it may be appropriate for NAS to handle prioritisation. AS may still handle prioritisation but possibly taking into account further information provided by NAS.

In an embodiment, options are provided for prioritising QoE information for transfer to the network when the network configures limitations to be observed e.g. maximum data rate:

a) AS provides the data transfer limitation (e.g. a maximum data rate) to NAS and leaves it to NAS to select which QoE information to submit to AS for transfer to network i.e. which information to prioritise
b) NAS provides the information required by AS to determine the priority for each piece of QoE information e.g. upon submitting the information to AS. This may include e.g:
NAS indicates the priority of each QoE information entry NAS provides information regarding arrival time of each QoE information entry The following relates to further issues related to re-use of log MDT. As indicated in the previous, the UE so far has a single log MDT configuration stored. Whenever the network signals a new configuration, the UE will discard the existing or previously received configuration or replace it with the newly received configuration. For log MDT, introduced in NR REL-16, it was agreed that such overwriting should be avoided for one particular case i.e. when the network signals management based log MDT configuration while the UE still has an ongoing signalling based log MDT configuration. In the following, it is described how general log MDT aspects may be affected by re-use of log MDT framework for QoE information.

The log MDT configuration used for QoE information includes two options i.e. management based log MDT and signalling based log MDT configuration, and the following principles apply (noting that overwrite concerns configuration and stored results).

The UE should avoid the situation where signalling based log MDT (sig-Log MDT) configuration is overwritten by management based log MDT (mgm-Log MDT) configuration. Support for different options regarding overwrite of regular log MDT by QoE related log MDT, includes the following:

QoE related log MDT is handled the same as regular log MDT

The UE does not overwrite QoE related log MDT by regular log MDT

The UE does not overwrite QoE related mgm-Log MDT by regular mgm-Log MDT

Overwriting restrictions may depend on the availability of stored results. Some overwriting options excluded according to the foregoing, may be accepted if the UE has no or few results stored and/or logging is nearly finalised. Some overwriting options allowed according to the foregoing, may be prohibited if UE has (substantial) results stored, even if logging is finalised Options provided regarding the log MDT configuration used for QoE information include the following options:

1. the UE supports one log MDT configuration, at least per RAT, and it can either be for QoE information or for other purposes i.e. UE cannot simultaneously support both
2. the UE has a separate log MDT configuration for QoE information i.e. UE can simultaneously support regular log MDT and log MDT for QoE information Options provided regarding the log MDT configuration used for QoE information include the following options:

1. For the purpose of QoE information, the UE supports one log MDT configuration that covers QoE information handling for both connected and idle or inactive modes. I.e. upon state change, the same configuration is used unless network reconfigures the configuration at such time
2. For the purpose of QoE information, the UE supports two log MDT configurations i.e. one covering QoE information handling in connected mode and another one covering the handling in idle or inactive mode. I.e. upon state transition, the UE switches from one configuration to the other and the network can use a different configuration in the two states, without having to reconfigure upon state transition Options provided regarding handling of the log MDT results for QoE information include the following options:

1. Use a common storage pool for results of log MDT results
2. Use a separate storage pool for results of Log MDT for purpose of QoE information, either:
   - A common pool, containing both results logged in connected and results logged in idle/inactive mode; or
   - Separate pools, i.e. one pool containing results logged in connected and another pool containing results logged in idle/inactive mode
3. In case separate pools are used, the indication of available log MDT results can include the following options:
   - A common field covering results of both results logged in connected and results logged in idle or inactive mode
   - Separate fields i.e. one field covering results logged in connected and another field covering results logged in idle or inactive mode
   - A common field, and the network indicates, by some other, means which results it should cover
4. In case separate pools are used, the retrieval request for log MDT results can include the following options:
   - A common field covering results of both results logged in connected and results logged in idle/inactive mode
   - Separate fields i.e. one field covering results logged in connected and another field covering results logged in idle/inactive mode
   - A common field and network indicates by some other means which results it should cover The following embodiments relate to the use of delta signalling. As indicated in the foregoing, the size of configuration for QoE can be quite large, e.g. sizes of octet string used in LTE, as indicated in the previous, (1000 octets). This means that, in general, it is preferable to avoid having to signal the entire configuration e.g. when network merely wants to perform a minor change of the configuration. In such a case, it is preferable to merely signal the part of the configuration that has changed (i.e. to use delta signalling) rather than signal the entire configuration (i.e. full configuration, with the UE discarding the current configuration and adding the newly received configuration, or doing a replace).

Embodiments of the invention support delta signalling for the log MDT configuration used for QoE information, in particular for the following cases:

Upon transition to/from connected

Upon UE mobility, possibly including IRAT change

Upon (re-)configuration of the log MDT configuration for QoE information, support is provided for different options for the handling of log MDT results stored by the UE (i.e. not yet transferred to the network):

Discard log MDT results, either all results or only those that are related to the configuration that is changed Keep the log MDT results, either all results or only those that are related to the configuration that is changed Network indicates whether log MDT results are to be discarded or kept, either all results, only those that are related to the configuration that is changed, or network indicating which results are to be discarded The following embodiments relate to handling of QoE in MRDC. In case a UE is in MRDC, some of the QoE information may concern SN controlled configuration e.g. SN terminated DRBs. The information may be most relevant for the SN to receive. However, so far, log MDT is merely set by MN and forwarded by MN to TCE.

Options are provided for handling QoE related log MDT configuration for a UE in MRDC, including:

All configuration is set by MN and all results are transferred to MN

Some results that are transferred to MN may be forwarded to SN. Such results may be carried in an octet string container to facilitate transparent forwarding by SN Some results are transferred to SN directly i.e. using SRB3

Some configuration may be set by SN

Configuration may originally set by a first node and later be handled by another node e.g. when DRB termination point changes from one node to another. Options for the reconfiguration used in such case include the following:

Delta signalling i.e. new node merely indicates changes compared to the configuration set by the previous node Full signalling i.e. new node signals the entire configuration and UE discards previous configuration or replaces it with the newly received configuration Standard may specify which option applies for which part and or in which case, or network may indicate this e.g. by use of explicit signalling Combinations of the above FIG. 1 shows a message exchange between a UE 100 and a RAN 110, illustrating aspects of the present invention in both Mode N and Mode U.

The UE 100 is configured to perform QoE reporting in idle or inactive (in the figure the term "idle" is intended to cover both idle and inactive). This is done by providing QoE configuration, which (mainly) concerns upper layer information (410). It may be done upon transition to idle/inactive (i.e. in Release message) or prior to transition to idle or inactive (i.e. in LoggedMeasurementConfig message)

Upon entering idle or inactive (415), the UE 100 starts to perform QoE reporting accordingly i.e. logging or storing QoE information (425) e.g. regarding MBS services. This may be affected by configuration parameters provided on BCCH (SIB) or MCCH (420). These (mainly) concern AS parameters by which the network can control the operations regarding logging of QoE info (mode N).

The UE provides availability indication during connection setup (430); Upon transition to connected mode (435), the UE 100 behaves according to mode N; the Network initiates retrieval of the information that UE logged (440); and Operations may be affected by configuration provided on BCCH or by dedicated signalling, as set out previously.

The UE 100 may subsequently perform QoE reporting using mode U. This may be affected by configuration parameters provided on BCCH (SIB) or DCCH (450, 455). These (mainly) concern AS parameters by which the network can control the operations regarding logging of QoE info (mode U). The Network may provide a configuration to switch to and/or to control UE operation within mode U. The UE initiates transfer of QoE information to network e.g. by sending MeasReportAppLayer message (460). The network may control the transfer by configuration parameters, either provided by BCCH or MCCH or by dedicated signalling.

Operations may be affected by configuration provided on BCCH or by dedicated signalling, as set out previously.

Finally, the UE may start using mode U upon receiving request from network to switch to mode U. The UE may use mode U for a subset of the QoE information while mode N is still used for other QoE information.

FIG. 5 illustrates the configuration of a terminal in a wireless communication system according to various embodiments.

The configuration illustrated in FIG. 5 may be understood as the configuration of the terminal. Hereinafter, terms such as " . . . unit," " . . . part" or the like used below mean units for processing at least one function or operation, which may be implemented by hardware or software, or a combination of hardware and software.

Referring to FIG. 5, the terminal includes a radio-frequency (RF) processor 510, a baseband processor 520, a storage unit 530, and a controller 540.

The RF processor 510 performs functions for transmitting and receiving signals via a wireless channel, such as band conversion and amplification of the signal. That is, the RF processor 510 upconverts the baseband signal provided from the baseband processor 520 to an RF band signal, transmits the same through an antenna, and downconverts the RF band signal received through the antenna to a baseband signal. For example, the RF processor 510 may include a transmission filter, a reception filter, an amplifier, a mixer, an oscillator, a digital-to-analog convertor (DAC), an analog-to-digital convertor (ADC), or the like. In the figure, only one antenna is shown, but the terminal may have multiple antennas. In addition, the RF processor 510 may include a plurality of RF chains. Furthermore, the RF processor 510 may perform beamforming. For the beamforming, the RF processor 510 may adjust the phase and magnitude of each of signals transmitted and received through a plurality of antennas or antenna elements. In addition, the RF processor 510 may perform multiple-input multiple-output (MIMO) operation and receive multiple layers when performing MIMO operation.

The baseband processor 520 performs a function of conversion between a baseband signal and a bit stream according to the physical-layer standard of the system. For example, during data transmission, the baseband processor 520 generates complex symbols by encoding and modulating a transmission bit stream. In addition, when receiving data, the baseband processor 520 restores the received bit stream through demodulation and decoding of the baseband signal provided from the RF processor 510. For example, in the case of conforming to an orthogonal frequency-division multiplexing (OFDM) method, when transmitting data, the baseband processor 520 generates complex symbols by encoding and modulating a transmission bit string, maps the complex symbols to subcarriers, and then configures OFDM symbols through an inverse fast Fourier transform (IFFT) operation and cyclic prefix (CP) insertion. In addition, when receiving data, the baseband processor 520 divides the baseband signal provided from the RF processor 510 into OFDM symbol units, restores signals mapped to subcarriers through a fast Fourier transform (FFT) operation, and restores the received bit stream through demodulation and decoding.

The baseband processor 520 and the RF processor 510 transmit and receive signals as described above. Accordingly, each of the baseband processor 520 and the RF processor 510 may be referred to as a transmitter, a receiver, a transceiver, or a communication unit. Furthermore, at least one of the baseband processor 520 and the RF processor 510 may include a plurality of communication modules to support a plurality of different wireless access technologies. Also, at least one of the baseband processor 520 and the RF processor 510 may include different communication modules to process signals in different frequency bands. For example, the different wireless access technologies may include a wireless LAN (e.g., IEEE 802.11), a cellular network (e.g., LTE), and the like. In addition, the different frequency bands may include a super-high-frequency (SHF) band (e.g., 2.NRHz) and a millimeter-wave (e.g., 60 GHz) band.

The storage unit 530 stores data such as a basic program, an application, and configuration information for the operation of the terminal. In particular, the storage unit 530 may store information related to a second access node performing wireless communication using a second radio access technology. Then, the storage unit 530 provides stored data in response to the request from the controller 540.

The controller 540 controls the overall operation of the terminal. For example, the controller 540 transmits and receives signals through the baseband processing unit 520 and the RF processor 510. In addition, the controller 540 writes and reads data in the storage unit 530. To this end, the controller 540 may include at least one processor. For example, the controller 540 may include a communication processor (CP) that performs control for communication and an application processor (AP) that controls an upper layer such as an application.

According to various embodiments, the controller 540 may include a multiple-connection processor 542. As described above, the multiple-connection processor 542 may perform a function of controlling the terminal to perform overall procedures related to a MDT in a wireless communication system.

FIG. 6 illustrates the configuration of a base station in a wireless communication system according to various embodiments.

The configuration illustrated in FIG. 6 may be understood as the configuration of at least one of the gNB or the eNB. Hereinafter, terms such as "... unit," "... part" or the like used below mean a unit that processes at least one function or operation, which may be implemented by hardware or software, or a combination of hardware and software.

Referring to FIG. 6, the base station includes an RF processor 610, a baseband processor 620, a backhaul communication unit 630, a storage unit 640, and a controller 650.

The RF processor 610 performs functions for transmitting and receiving signals via a wireless channel, such as band conversion, amplification, or the like. That is, the RF processor 610 upconverts the baseband signal provided from the baseband processor 620 to a radio-frequency (RF) band signal, transmits the same through an antenna, and downconverts the RF band signal received through the antenna to a baseband signal. For example, the RF processor 610 may include a transmission filter, a reception filter, an amplifier, a mixer, an oscillator, a DAC, an ADC, or the like. In the figure, only one antenna is shown, but the first access node may have multiple antennas. In addition, the RF processor 610 may include a plurality of RF chains. Furthermore, the RF processor 610 may perform beamforming. For the beamforming, the RF processor 610 may adjust the phase and magnitude of each of signals transmitted and received through a plurality of antennas or antenna elements. The RF processor 610 may perform downlink MIMO operation by transmitting more than one layer.

The baseband processor 620 performs a function of conversion between a baseband signal and a bit stream according to the physical-layer standard of the first wireless access technology. For example, when transmitting data, the baseband processor 620 generates complex symbols by encoding and modulating a transmission bit stream. In addition, when receiving data, the baseband processor 620 restores the received bit stream through demodulation and decoding of the baseband signal provided from the RF processor 610. For example, in the case of conforming to an OFDM method, when transmitting data, the baseband processor 620 generates complex symbols by encoding and modulating a transmission bit string, maps the complex symbols to subcarriers, and then configures OFDM symbols through the IFFT operation and CP insertion. In addition, when receiving data, the baseband processor 620 divides the baseband signal provided from the RF processor 610 into OFDM symbol units, restores signals mapped to subcarriers through the FFT operation, and restores the received bit stream through demodulation and decoding. The baseband processor 620 and the RF processor 610 transmit and receive signals as described above. Accordingly, each of the baseband processor 620 and the RF processor 610 may be referred to as a transmitter, a receiver, a transceiver, a communication unit, or a wireless communication unit.

The backhaul communication unit 630 provides an interface for communicating with other nodes in the network. That is, the backhaul communication unit 630 converts the bit stream transmitted from the main base station to another node, for example, an auxiliary base station, a core network, or the like, into a physical signal, and converts the physical signal received from another node into a bit stream.

The storage unit 640 stores data such as a basic program, an application, and configuration information for the operation of the main base station. In particular, the storage unit 640 may store information about bearers allocated to the connected terminal, measurement results reported from the connected terminal, and the like. In addition, the storage unit 640 may store information serving as a reference for determining whether to provide or stop multiple connections to the terminal. Then, the storage unit 640 provides data stored at the request of the controller 650.

The controller 650 controls the overall operation of the main base station. For example, the controller 650 transmits and receives signals through the baseband processor 620 and the RF processor 610 or through the backhaul communication unit 630. In addition, the controller 650 writes and reads data in the storage unit 640. To this end, the controller 650 may include at least one processor.

According to various embodiments, the controller 650 may include a multiple-connection processor 652. As described above, the multiple-connection processor 652 may perform a function of controlling the terminal to perform overall procedures related to a MDT in wireless communication system.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a wireless communication system, the method comprising:
- transmitting, to a base station, UE capability information indicating whether the UE supports a logging and a reporting of an early measurement;
- receiving, from the base station, a logged measurement configuration message including first information indicating the UE to log the early measurement on a first frequency and inter frequency target information indicating the first frequency;
- performing a measurement on the first frequency and a measurement on a second frequency based on the first information and the inter frequency target information;
- receiving, from the base station, a UE information request message including second information for requesting a report of a logged measurement; and
- transmitting, to the base station, a UE information response message including a first result of the measurement on the first frequency and a second result of the measurement on the second frequency,
- wherein the first frequency is different from the second frequency, and the second frequency includes a frequency included in a system information block 4 (SIB4).

2. The method of claim 1, further comprising:
- transmitting, to the base station, third information indicating an availability of the first result and the second result.

3. The method of claim 1, wherein the first frequency includes a non-system information block 4 (non-SIB4) frequency.

4. A method performed by a base station in a wireless communication system, the method comprising:
- receiving, from a user equipment (UE), UE capability information indicating whether the UE supports a logging and a reporting of an early measurement;
- transmitting, to the UE, a logged measurement configuration message including first information indicating the UE to log the early measurement on a first frequency and inter frequency target information indicating the first frequency;
- transmitting, to the UE, a UE information request message including second information for requesting a report of a logged measurement; and
- receiving, from the UE, a UE information response message including a first result of a measurement on the first frequency a second result of a measurement on a second frequency based on the first information and the inter frequency target information,
- wherein the first frequency is different from the second frequency, and the second frequency includes a frequency included in a system information block 4 (SIB4).

5. The method of claim 4, further comprising:
- receiving, from the UE, third information indicating an availability of the first result and the second result.

6. The method of claim 4, wherein the first frequency includes a non-system information block 4 (non-SIB4) frequency.

7. A user equipment (UE) comprising:
- at least one transceiver;
- at least one processor communicatively coupled to the at least one transceiver; and
- at least one memory, communicatively coupled to the at least one processor, storing instructions executable by the at least one processor individually or in any combination to cause the UE to:
  - transmit, to a base station, UE capability information indicating whether the UE supports a logging and a reporting of an early measurement,
  - receive, from the base station, a logged measurement configuration message including first information indicating the UE to log the early measurement on a first frequency and inter frequency target information indicating the first frequency,
  - perform a measurement on the first frequency and a measurement on a second frequency based on the first information and the inter frequency target information,
  - receive, from the base station, a UE information request message including second information for requesting a report of a logged measurement, and
  - transmit, to the base station, a UE information response message including a first result of the measurement on the first frequency and a second result of the measurement on the second frequency,
- wherein the first frequency is different from the second frequency, and the second frequency includes a frequency included in a system information block 4 (SIB4).

8. The UE of claim 7, wherein the instructions further cause the UE to:
- transmit, to the base station, third information indicating an availability of the first result and the second result.

9. The UE of claim 7, wherein the first frequency includes a non-system information block 4 (non-SIB4) frequency.

10. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

receive, from a user equipment (UE), UE capability information indicating whether the UE supports a logging and a reporting of an early measurement, transmit, to the UE, a logged measurement configuration message including first information indicating the UE to log the early measurement on a first frequency and inter frequency target information indicating the first frequency, transmit, to the UE, a UE information request message including second information for requesting a report of a logged measurement, and receive, from the UE, a UE information response message including a first result of a measurement on the first frequency and a second result of a measurement on a second frequency based on the first information and the inter frequency target information, wherein the first frequency is different from the second frequency, and the second frequency includes a frequency included in a system information block 4 (SIB4).

11. The base station of claim 10, wherein the instructions further cause the base station to:

receive, from the UE, third information indicating an availability of the first result and the second result.

12. The base station of claim 10, wherein the first frequency includes a non-system information block 4 (non-SIB4) frequency.

* * * * *